(12) United States Patent
Kim

(10) Patent No.: US 8,423,684 B2
(45) Date of Patent: Apr. 16, 2013

(54) DISPLAY APPARATUS OPERATED IN MULTIPLE MODES AND MODE CHANGING METHOD THEREOF

(75) Inventor: Jung-dae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 12/536,161

(22) Filed: Aug. 5, 2009

(65) Prior Publication Data

US 2010/0082845 A1 Apr. 1, 2010

(30) Foreign Application Priority Data

Sep. 29, 2008 (KR) .................. 10-2008-0095452

(51) Int. Cl.
*G06F 3/00* (2006.01)
*G06F 13/12* (2006.01)

(52) U.S. Cl.
USPC .................................... 710/14; 710/8; 710/62

(58) Field of Classification Search .................. None
See application file for complete search history.

(56) References Cited

U.S. PATENT DOCUMENTS

2006/0170669 A1* 8/2006 Walker et al. ................ 345/418
2008/0122825 A1* 5/2008 Choi et al. .................... 345/211

OTHER PUBLICATIONS

Apple Computer, Ipod Features Guide, 2006, Apple Computer, all pages, http://manuals.info.apple.com/en_US/iPOD_Late_2006_Features_Guide.pdf.*
IPod mini User's Guide, Copyright 2004, pp. 1-62.*

* cited by examiner

*Primary Examiner* — Idriss N Alrobaye
*Assistant Examiner* — David Martinez
(74) *Attorney, Agent, or Firm* — Sughrue Mion, PLLC

(57) ABSTRACT

A display apparatus operable in plural modes and a mode changing method thereof are disclosed. The display apparatus includes a storage unit which stores information about a final mode, and a controller which changes a mode of the display apparatus to the final mode and displays a corresponding screen if the display apparatus is connected to a host device.

14 Claims, 6 Drawing Sheets

100

```
         110              160
    ┌──────────┐     ┌──────────┐
    │  SIGNAL  │────▶│  OUTPUT  │
    │PROCESSOR │     │   UNIT   │
    └──────────┘     └──────────┘
          ▲
          │
  120    150            130
┌────────┐ ┌──────────┐ ┌──────────┐
│INTERFACE│◀▶│CONTROLLER│◀─│INPUT UNIT│
└────────┘ └──────────┘ └──────────┘
               ▲
               │
         140 ┌──────────┐
             │ STORAGE  │
             │   UNIT   │
             └──────────┘
```

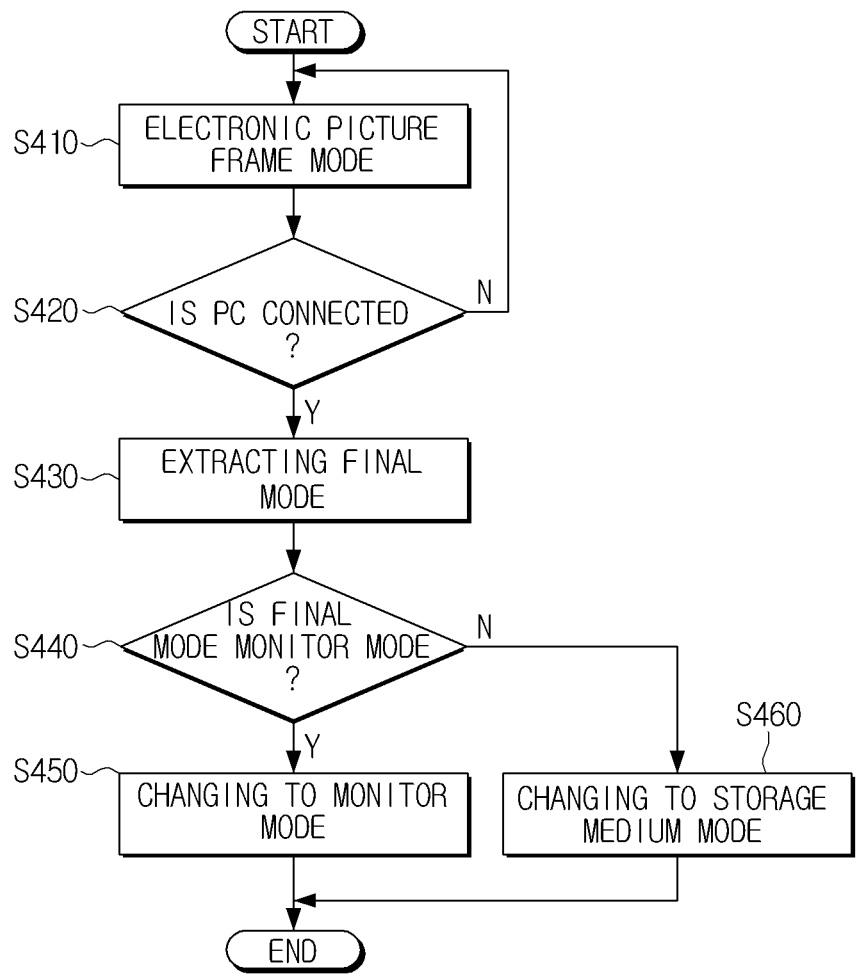

DISPLAY APPARATUS OPERATED IN MULTIPLE MODES AND MODE CHANGING METHOD THEREOF

CROSS-REFERENCE TO RELATED APPLICATIONS

This application claims priority from Korean Patent Application No. 10-2008-95452, filed on Sep. 29, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to a display apparatus and a mode changing method thereof, and more particularly, to a display apparatus which is operable in multiple modes if it is connected to a host device and a mode changing method thereof.

2. Description of the Related Art

In recent years, a user's reliance on a display apparatus has increased, and peripheral video devices are increasingly used along with personal computers (PCs) or televisions (TVs).

Such a peripheral video device has its own display and is used by being connected to a host device, such as a PC or a TV. Also, the peripheral video device is operated in various modes to perform various functions, and therefore, a user uses the peripheral video device in various modes. For example, a user uses the peripheral video device to watch a movie or a photo, or listen to downloaded music.

In particular, an electronic picture frame may be connected to a PC, which is a universal serial bus (USB) host, using a general USB port. The electronic picture frame is operated in a monitor mode, in which the electronic picture frame is operated as a monitor, or a storage medium mode, in which the electronic picture frame is operated as a storage medium.

However, the electronic picture frame is recognized as being in a storage medium mode to act as a storage medium if the electronic picture frame is connected to the PC. Accordingly, the electronic picture frame displays a screen used in the storage medium mode. Therefore, in order to use the electronic picture frame as a monitor when the electronic picture frame is connected to a PC, the user should perform all necessary manipulations to change the mode.

As described above, since the peripheral video device can be operated in various modes, the user is required to perform complicated manipulations to change the mode, which is inconvenient for the user.

Therefore, an easy, convenient method of allowing a user to manipulate a mode of a peripheral video device is needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an electronic picture frame operated in plural modes, and a mode changing method thereof, which can easily set and change a mode of a display apparatus connected to a host device.

According to an aspect of the present invention, there is provided a display apparatus which is operable in a plurality of modes, the display apparatus comprising a storage unit which stores information about a final mode among the plurality of modes, and a controller which changes a mode among the plurality of modes of the display apparatus to the final mode if the display apparatus is connected to a host device.

The display apparatus may be connected to the host device by a universal serial bus (USB) cable.

If the display apparatus is disconnected from the host device, the controller may change the mode of the display apparatus from the final mode to another one of the plurality of modes, and store information about the changed mode in the storage unit.

The display apparatus may further comprise an interface which transmits change information indicating that the mode is changed to the host device, and receives data corresponding to the changed mode from the host device. The controller may change the mode of the display apparatus to the final mode using the received data.

The plurality of modes may comprise a monitor mode in which the display apparatus operates as a monitor and a storage medium mode in which the display apparatus operates as a storage medium.

The display apparatus may be an electronic picture frame, and the host device may be a personal computer (PC).

According to another aspect of the present invention, there is provided a method of changing a mode of a display apparatus which is operable in a plurality of modes, the method comprising storing information about a final mode among the plurality of modes, and changing a mode of the display apparatus to the final mode if the display apparatus is connected to a host device.

The display apparatus may be connected to the host device by a USB cable.

The method may further comprise, if the display apparatus is disconnected from the host device, changing the mode of the display apparatus from the final mode to another one of the plurality of modes, and storing the changed mode.

The changing may comprise transmitting change information indicating the mode is changed to the host device, receiving data corresponding to the changed mode from the host device, and changing the mode of the display apparatus to the final mode using the received data.

The plurality of modes may comprise a monitor mode in which the display apparatus operates as a monitor and a storage medium mode in which the display apparatus operates as a storage medium.

According to still another aspect of the present invention, there is provided a display apparatus which is operable in a plurality of modes, the display apparatus comprising an interface which, if the display apparatus is connected to a host device, transmits information about a final mode among the plurality of modes to the host device, and receives data corresponding to the final mode, and a controller which changes a mode among the plurality of modes of the display apparatus to the final mode using the received data.

The display apparatus may further comprise a storage unit which stores information about the final mode, and, if the display apparatus is disconnected from the host device, the controller may update the information about the final mode of the display apparatus and store the updated information in the storage unit.

According to still another aspect of the present invention, there is provided a method of changing a mode of a display apparatus which is operable in a plurality of modes, the method comprising, transmitting information about a final mode among the plurality of modes to a host device if the display apparatus is connected to the host device, receiving data corresponding to the final mode, and changing a mode of the display apparatus to the final mode using the received data.

The method may further comprise, if the display apparatus is disconnected from the host device, updating information about the final mode of the display apparatus.

BRIEF DESCRIPTION OF THE DRAWINGS

The above and/or other aspects of the present invention will be more apparent by describing certain exemplary embodiments of the present invention with reference to the accompanying drawings, in which:

FIG. 4 is a flow chart of a mode changing method according to an exemplary embodiment of the present invention.

DETAILED DESCRIPTION OF EXEMPLARY EMBODIMENTS

Figure 1:
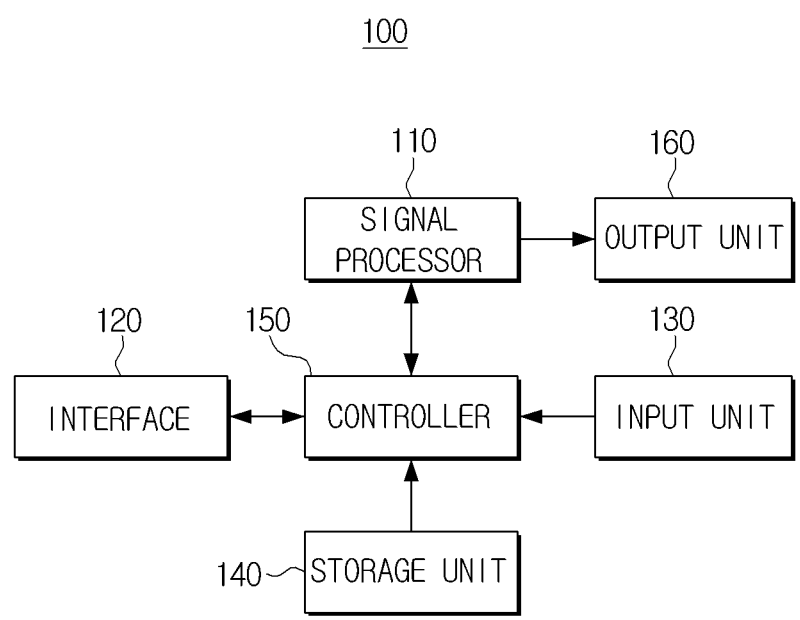
FIG. 1 is a block diagram of an electronic picture frame according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as the detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram of an electronic picture frame according to an exemplary embodiment of the present invention. The electronic picture frame is connected to a host device (not shown), such as a personal computer (PC), and is operated in plural modes to perform various functions, such as video and audio output, image display, and data storage.

Referring to FIG. 1, the electronic picture frame 100 comprises a signal processor 110, an interface 120, an input unit 130, a storage unit 140, a controller 150, and an output unit 160.

The signal processor 110 decompresses a video signal or an audio signal input through the interface 120 or the storage unit 140, which will be described in detail below, and performs signal-processing to reproduce the signal.

More specifically, the signal processor 110 decompresses a video signal or an audio signal input through the interface 120 or pre-stored in the storage unit 140, and performs signal-processing such as digital-to-analog (D/A) converting or scaling with respect to the decompressed video signal or audio signal. The signal processor 110 transmits the processed video signal or audio signal to the output unit 160.

The output unit 160 receives and outputs the processed video signal or audio signal. The output unit 160 may be a speaker (not shown) to output a sound corresponding to the processed audio signal, a display unit (not shown) to display an image corresponding to the processed video signal, or other output device.

The interface 120 is connected to a host device to receive a video signal or an audio signal from the host device, and supply the video signal or the audio signal to the storage unit 140 or the controller 150.

The interface 120 may comprise a universal serial bus (USB) connector to be connected with a USB cable. Accordingly, the electronic picture frame 100 may receive a video signal or an audio signal from a host device through the USB cable.

If the electronic picture frame 100 is connected to a host device through the USB cable, the electronic picture frame 100 changes its mode, which will be described in detail below.

If the mode of the electronic picture frame 100 is changed, the interface 120 transmits mode change information, indicating that the mode of the electronic picture frame 100 is changed, to the host device, and receives data corresponding to the changed mode from the host device. The mode change information is generated at the controller 150, and the data corresponding to the changed mode is transmitted to the controller 150.

In particular, the interface 120 transmits information on a final mode of the electronic picture frame 100, which is stored in the storage unit 140, to the host device, and receives data corresponding to the final mode.

The interface 120 may further comprise a memory card connector to which a removable memory card has access. The interface 120 reads out data of an image file or audio file from the memory card through the memory card connector and stores the data to the storage unit 140 or supplies the data to the controller 150.

The input unit 130 receives a user command to control operation of the electronic picture frame 100 and transmits the user command to the controller 150. The input unit 130 may comprise a plurality of button keys to receive commands from a user.

The storage unit 140 stores program information, contents, menu information and icon information which are required to control the electronic picture frame 100. The storage unit 140 may be embodied as a read only memory (ROM), a flash memory, a random access memory (RAM), or other memory.

In particular, the storage unit 140 stores information on a final mode of the electronic picture frame 100 at the time the electronic picture frame 100 is disconnected from the host device.

The controller 150 controls the entire operation of the electronic picture frame 100. In particularly, the controller 150 changes the mode of the electronic picture frame 100.

If the electronic picture frame 100 is connected to the host device through the USB cable, the controller 150 may change the mode of the electronic picture frame 100 between plural modes in sequence, to a most frequently used mode, or to a pre-set mode.

If the electronic picture frame 100 is disconnected from the host device after once being connected to the host device, the controller 150 generates information on a final mode, which is available until the disconnection, and stores the information to the storage unit 140. Also, if the electronic picture frame 100 is connected to the host device, the controller 150 extracts information on the final mode from the storage unit 140 and controls the electronic picture frame 100 to operate according to the final mode.

If the electronic picture frame 100 is connected to the host device, the controller 150 transmits information on the final mode stored in the storage unit 140 to the host device through the interface 120. Accordingly, the host device transmits data for operating the connected electronic picture frame 100 in the final mode to the electronic picture frame 100.

After that, if the electronic picture frame 100 is disconnected from the host device, the controller 150 updates the mode to be the mode before the disconnection and stores the updated mode in the storage unit 140.

Accordingly, the user is able to easily change the mode, without performing an inconvenient and complicated manipulation procedure, and use the electronic picture frame 100 according to the final mode.

Types of modes, which are available if the electronic picture frame 100 is not connected to the host device, will be described with reference to FIGS. 2A to 2C.

Figure 2A:
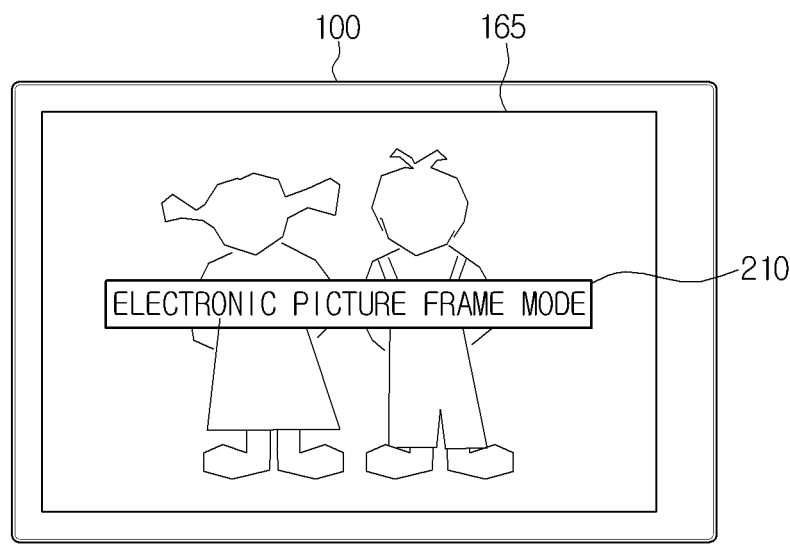
FIGS. 2A to 2C are exemplary views of types of modes if the electronic picture frame is not connected to a host device.

FIG. 2A is a view illustrating the electronic picture frame 100 which is operated in an electronic picture frame mode.

In general, image data generated by a digital device may be printed on a film and stored on a storage medium to be used in an electronic picture frame. The electronic picture frame is a device designed to display image data of a digital file format on a screen.

The electronic picture frame can store a large number of images in a NAND flash memory compared to a general picture frame. Further, the electronic picture frame is advantageous in that it is portable and occupies less space.

As shown in FIG. 2A, if the mode of the electronic picture frame 100 is changed to an electronic picture frame mode, the electronic picture frame 100 outputs a message 210, indicating that the electronic picture frame 100 is in an electronic picture frame mode, and an image on the display unit 165.

Figure 2B:
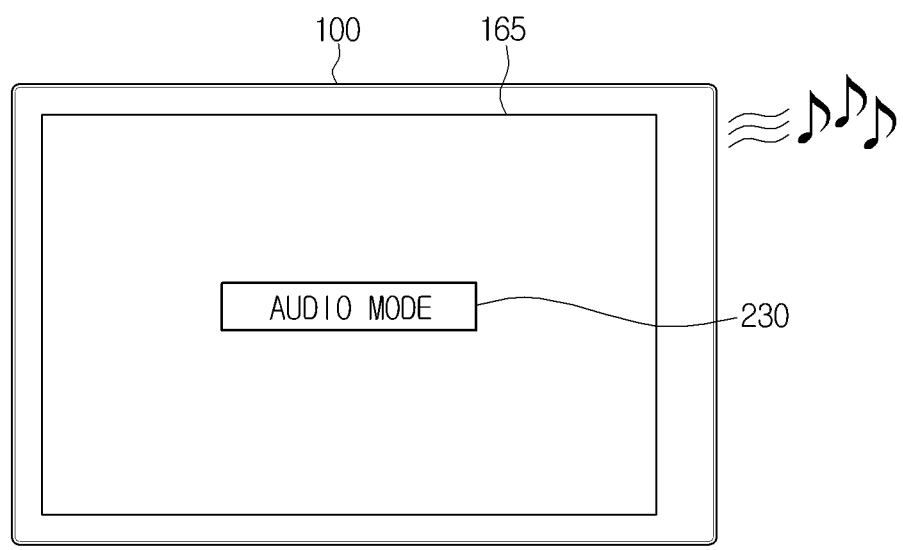

FIG. 2B illustrates the electronic picture frame 100 which is operated in an audio mode. As shown in FIG. 2B, if the mode of the electronic picture frame 100 is changed to an audio mode, the electronic picture frame 100 outputs audio through a speaker (not shown) and outputs a message 230, indicating that the electronic picture frame 100 is in the audio mode, on the display unit 165.

Figure 2C:
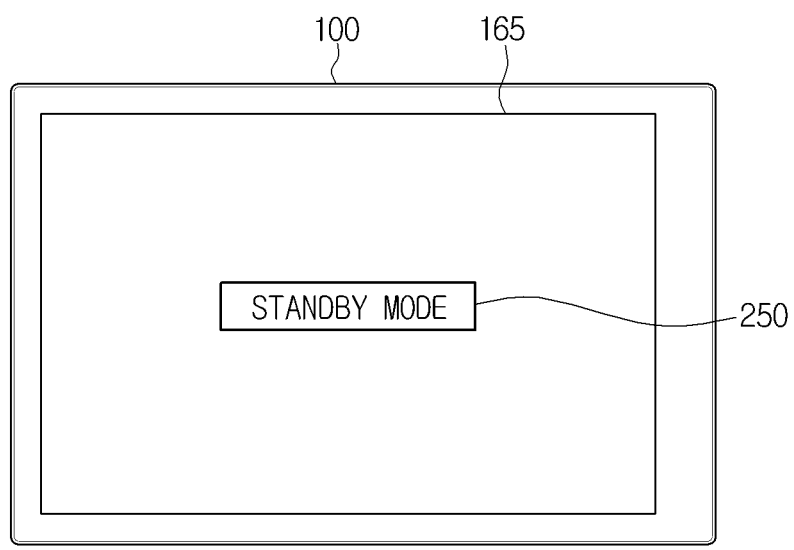

FIG. 2C illustrates the electronic picture frame 100 which is operated in a standby mode. As shown in FIG. 2C, if the mode of the electronic picture frame 100 is changed to a standby mode, the electronic picture frame 100 is operated using only a standby power, and does not output audio or video through the speaker (not shown) or the display unit 165. In the standby mode, however, the display unit 165 displays a message 250, indicating that the electronic picture frame 100 is in a standby mode, in the same manner as that of a screen saver of a PC.

As described above, the electronic picture frame 100 may operate in any of the three types of modes if the electronic picture frame 100 is not connected to the host device. However, the technical idea of the present invention is not limited to this. Therefore, if the electronic picture frame 100 is not connected to the host device, the electronic picture frame 100 may be operated in three or more modes or three or less modes. Also, if the electronic picture frame 100 is not connected to the host device, the electronic picture frame 100 may be not operated in any mode.

As described above, the messages 210, 230, 250 identifying each mode are displayed on the display unit 165, but this is merely an example. Also, the messages 210, 230, 250 may be displayed only at the time that the mode is changed, and also may not be displayed even if there is a mode change.

Types of modes which are available if the electronic picture frame 100 is connected to the host device will be described with reference to FIGS. 3A and 3B.

Figure 3A:
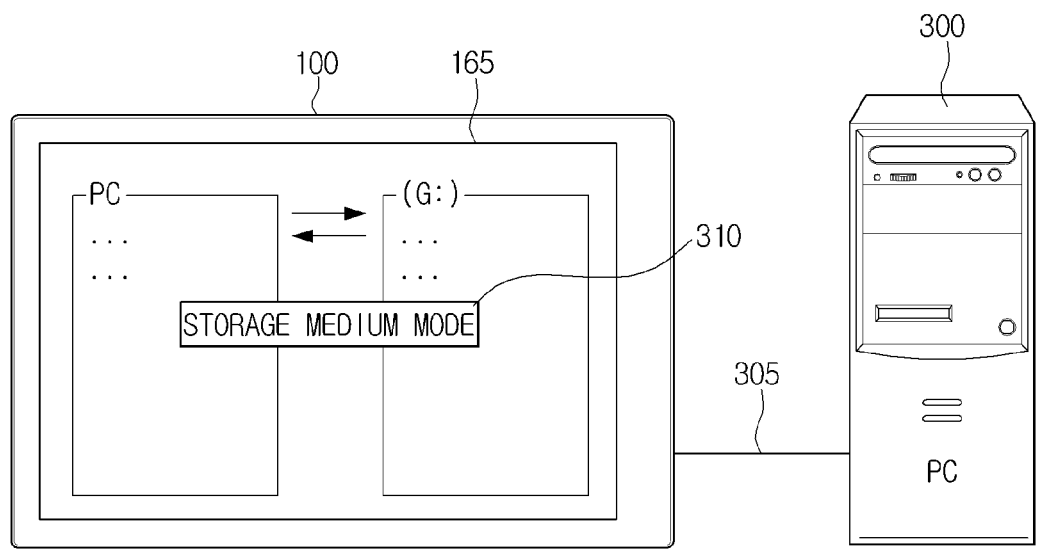
FIGS. 3A and 3B are exemplary views of types of modes if the electronic picture frame is connected to a host device.

FIG. 3A illustrates the electronic picture frame 100 which is operated in a storage medium mode. As shown in FIG. 3A, if the electronic picture frame 100 is connected to a PC 300, which is a host device, through the USB cable 305, the electronic picture frame 100 deactivates the mode before the connection, extracts information about a final mode, and is operated in the final mode using the extracted information about the final mode.

The mode before the connection means a mode available before the electronic picture frame 100 is connected to the PC 300 through the USB cable 305. Therefore, the mode before the connection may be any one of the exemplary modes shown in FIGS. 2A to 2C.

In this exemplary embodiment, the final mode is the storage medium mode. Since the electronic picture frame 100 is operated in the final mode, i.e., in the storage medium mode, the display unit 165 displays a screen showing that a file or folder can be transferred between the PC and the electronic picture frame 100. Also, the electronic picture frame 100 outputs a message (310), indicating that a current mode is the storage medium mode, on the display unit 165.

Figure 3B:
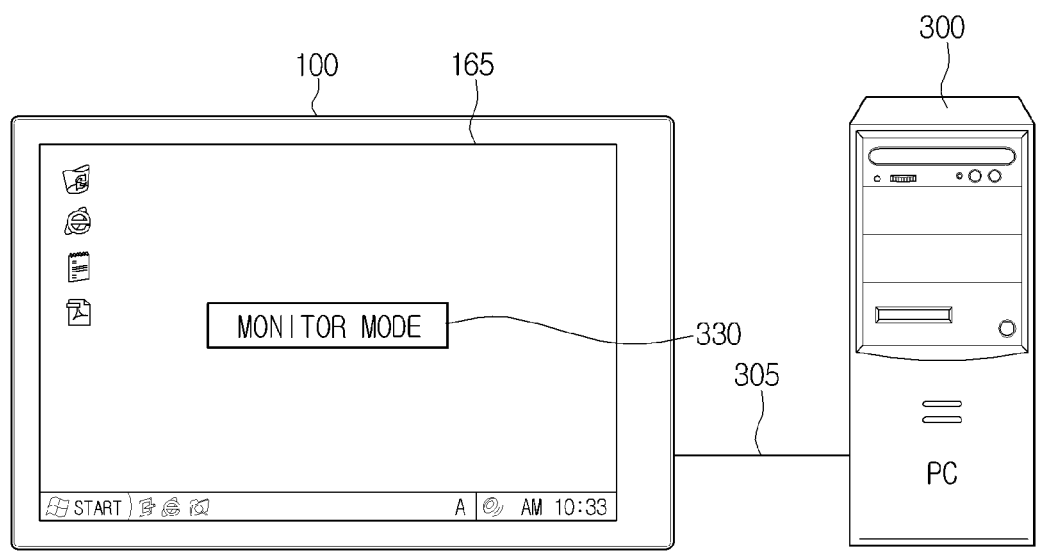

FIG. 3B is a view illustrating the electronic picture frame 100 which is operated in a monitor mode. As shown in FIG. 3B, if the electronic picture frame 100 is connected to the PC 300 through the USB cable 305, the electronic picture frame 100 deactivates the mode before the connection, extracts information about the final mode, and is operated in the final mode using the information about the final mode.

In this exemplary embodiment, the mode before the connection may be any one of the exemplary modes shown in FIGS. 2A to 2C.

In this embodiment, the final mode is the monitor mode. Since the electronic picture frame 100 is operated in the final mode, i.e., in the monitor mode, the display unit 165 displays a computer screen using data received from the PC. Also, the electronic picture frame 100 outputs a message 330, indicating that a current mode is the monitor mode, on the display unit 165.

As described above, the electronic picture frame 100 may operate according to two types of exemplary modes if the electronic picture frame 100 is connected to the host device. However, the technical idea of the present invention should not be limited thereto. Therefore, if the electronic picture frame 100 is connected to the host device, the electronic picture frame 100 may be operated in three or more modes.

Also, as described above, the messages 310, 330 indicating each mode are displayed on the display unit 165, but this is merely an example. The messages 310, 330 may be displayed only at the time that the mode is changed, i.e., if the electronic picture frame 100 is connected to the PC 300, or may be not displayed if there is mode change.

Also, as described above, the mode is changed to the final mode if the electronic picture frame 100 is connected to the PC 300 through the USB cable 305, but this is merely an example. Therefore, the present invention is applicable to the case where the electronic picture frame 100 is connected to the PC 300 through a different cable for transmitting data, such as an Ethernet cable. Also, the technical idea of the present invention is not necessarily limited to a wired environment. Therefore, the technical idea of the present invention is applicable to a wireless environment such as a wireless LAN, wireless USB, and Bluetooth.

FIG. 4 is a view illustrating a mode changing method according to an exemplary embodiment of the present invention.

In this exemplary embodiment of the present invention, if the electronic picture frame 100 is not connected to the host device, the electronic picture frame 100 is operated in an electronic picture frame mode, and, if the electronic picture frame 100 is connected to the host device, the electronic picture frame 100 is operated in either one of a monitor mode and a storage medium mode.

As described above, the electronic picture frame 100 is operated in the electronic picture frame mode if it is not connected to the host device (S410).

In the electronic picture frame mode, the controller 150 determines whether or not the electronic picture frame 100 is connected to the PC 300, which is a host device, through the USB cable 305 (S420).

If the electronic picture frame 100 is not connected to the PC 300 through the USB cable 305 (S420-N), the controller 150 maintains the mode of the electronic picture frame 100 as the current mode, i.e., the electronic picture frame mode (S410).

However, if the electronic picture frame 100 is connected to the PC 300 through the USB cable 305 (S420-Y), the controller 150 extracts a final mode of the electronic picture frame 100 stored in the storage unit 140 (S430).

The controller 150 transmits information about the final mode to the PC 300, and, if the extracted final mode is a monitor mode (S440-Y), the controller 150 receives data corresponding to the monitor mode of the final mode from the PC 300 and changes the mode of the electronic picture frame 100 to the monitor mode (S450).

If the final mode is not determined to be the monitor mode (S440-N), the controller 150 determines that the final mode is a storage medium mode, transmits information about the final mode to the PC 300, receives data corresponding to the storage medium mode from the PC 300, and changes the mode of the electronic picture frame 100 to the storage medium mode (S460).

Accordingly, it is possible to easily change the mode of the electronic picture frame 100, and thus eliminate inconvenience caused by a complicated mode changing procedure.

Figure 5A:
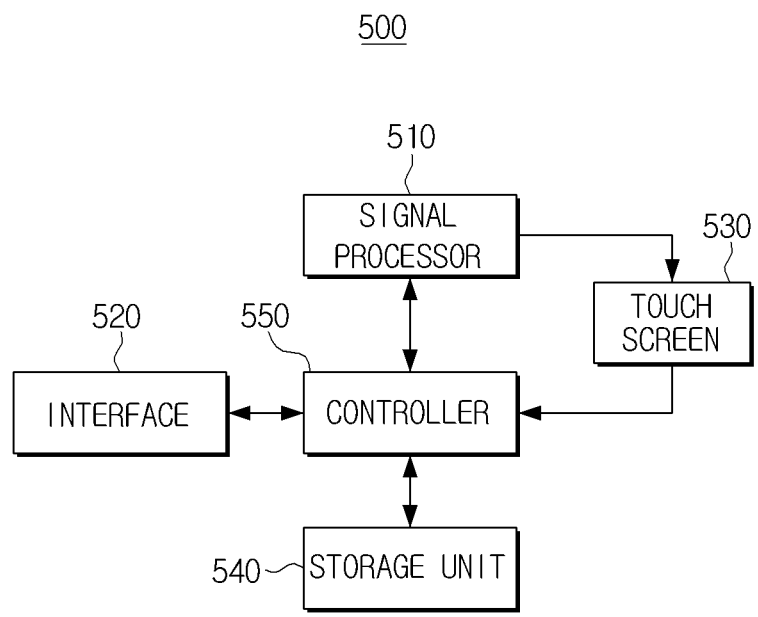
FIGS. 5A and 5B are a block diagram of an electronic picture frame and a view of a display unit according to another exemplary embodiment of the present invention, respectively.
Figure 5B:
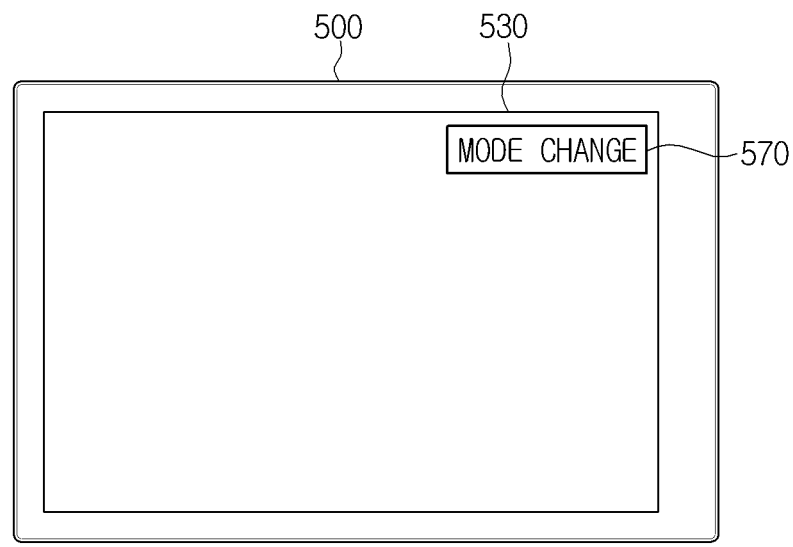

FIGS. 5A and 5B are a block diagram of an electronic picture frame and a view of a display unit according to another exemplary embodiment of the present invention, respectively.

An electronic picture frame 500 according to another exemplary embodiment of the present invention comprises a signal processor 510, an interface 520, a touch screen 530, a storage unit 540, and a controller 550. Since the signal processor 510, the interface 520, the storage unit 540, and the controller 550 of the electronic picture frame 500 are identical or similar to those of the electronic picture frame 100 of FIG. 1, detailed descriptions thereof will be omitted. Hereinafter, the touch screen 530 will be described in detail below.

The touch screen 530 receives a video signal or an audio signal and outputs the video signal or audio signal, like the output unit 160 of FIG. 1. Also, the touch screen 530 receives a user command to control the electronic picture frame 500 and transmits the user command to the controller 550 in a touch manner, like the input unit 130 of FIG. 1.

FIG. 5B illustrates the electronic picture frame 500 which has the touch screen 530 and is operated in a touch manner. The touch screen 530 displays a mode change item 570.

The mode change item 570 may be a message indicating a mode of the electronic picture frame 500, like the messages 310, 330 in FIGS. 3A and 3B, respectively.

Accordingly, if the electronic picture frame 500 is connected to the host device, the electronic picture frame 500 changes its mode to a final mode, or if the mode change item 570 displayed on the touch screen 530 is touched by a user after the electronic picture frame 500 is connected to the host device, the electronic picture frame 500 changes its mode to the final mode.

According to this exemplary embodiment of the present invention, it is possible to easily change the mode of the electronic picture frame 500, and thus eliminate inconvenience caused by a complicated mode changing procedure.

Although the electronic picture frames 100, 500 are explained in the above embodiments, they are merely exemplary embodiments. Therefore, the technical idea of the present invention is applicable to any other display apparatus that can be operated in plural modes.

According to the exemplary embodiments of the present invention described above, the mode of the display apparatus connected to the host device is automatically changed to the final mode before the disconnection. Accordingly, the inconvenience of requiring a complicated mode setting procedure is eliminated. Therefore, it is possible to easily change the mode of the display apparatus.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display apparatus which is operable in a plurality of display modes, the display apparatus comprising:
   a storage unit which stores information about a final display mode among the plurality of display modes; and
   a controller which sets a display mode of the display apparatus to the final display mode based on the information about the final display mode if the display apparatus is connected to a host device; and
   an interface which transmits change information, indicating that the display mode is changed, to the host device and receives data corresponding to the changed display mode from the host device,
   wherein the final display mode is a latest display mode in which a user operates the display apparatus immediately before the display apparatus is disconnected from the host device, and
   wherein the controller changes the display mode of the display apparatus to the final display mode using the received data.

2. The display apparatus as claimed in claim 1, wherein the display apparatus is connected to the host device by a universal serial bus (USB) cable.

3. The display apparatus as claimed in claim 1, wherein, if the display apparatus is disconnected from the host device, the controller changes the display mode of the display apparatus from the final display mode to another one of the plurality of display modes, and stores information about the changed display mode in the storage unit.

4. The display apparatus as claimed in claim 1, wherein the plurality of display modes comprise a monitor mode in which the display apparatus operates as a monitor and a storage medium mode in which the display apparatus operates as a storage medium.

5. The display apparatus as claimed in claim 1, wherein the display apparatus is an electronic picture frame, and the host device is a personal computer (PC).

6. The display apparatus as claimed in claim 1, wherein the final display mode is a display mode which is available at the time the display apparatus is finally connected to the host device.

7. A method of changing a display mode of a display apparatus which is operable in a plurality of display modes, the method comprising:
   storing information about a final display mode among the plurality of display modes; and
   setting the display mode of the display apparatus to the final display mode based on the stored information about the final display mode if the display apparatus is connected to a host device,
   wherein the final display mode is a latest display mode in which a user operates the display apparatus immediately before the display apparatus is disconnected from the host device, and
   wherein the setting the display mode comprises:
   transmitting change information indicating the display mode is changed to the host device;
   receiving data corresponding to the changed display mode from the host device; and
   changing the display mode of the display apparatus to the final display mode using the received data.

8. The method as claimed in claim 7, wherein the display apparatus is connected to the host device by a USB cable.

9. The method as claimed in claim 7, further comprising, if the display apparatus is disconnected from the host device, changing the display mode of the display apparatus from the final display mode to another one of the plurality of display modes, and storing information about the changed display mode.

10. The method as claimed in claim 7, wherein the plurality of display modes comprise a monitor mode in which the display apparatus operates as a monitor and a storage medium mode in which the display apparatus operates as a storage medium.

11. A display apparatus which is operable in a plurality of display modes, the display apparatus comprising:
   an interface which, if the display apparatus is connected to a host device, transmits information about a final display mode among the plurality of modes to the host device, and receives data corresponding to the final display mode from the host device; and
   a controller which sets a display mode among the plurality of display modes of the display apparatus to the final display mode based on the information about the final display mode using the received data from the host device,
   wherein the interface transmits change information, indicating that the display mode is changed, to the host device and receives data corresponding to the changed display mode from the host device; and
   wherein the final display mode is a latest display mode in which a user operates the display apparatus immediately before the display apparatus is disconnected from the host device; and
   wherein the controller changes the display mode of the display apparatus to the final display mode using the received data.

12. The display apparatus as claimed in claim 11, further comprising a storage unit which stores information about the final display mode,
   wherein, if the display apparatus is disconnected from the host device, the controller updates the information about the final display mode of the display apparatus and stores the updated information in the storage unit.

13. A method of changing a display mode of a display apparatus which is operable in a plurality of display modes, the method comprising:
   transmitting information about a final display mode among the plurality of display modes to a host device, when the display apparatus is connected to the host device;
   receiving data corresponding to the final display mode from the host device; and
   setting a display mode of the display apparatus to the final display mode based on the transmitted information about the final display mode using the received data,
   wherein the final display mode is a latest display mode in which a user operates the display apparatus immediately before the display apparatus is disconnected from the host device, and
   wherein the setting the display mode comprises:
   transmitting change information indicating the display mode is changed to the host device;
   receiving data corresponding to the changed display mode from the host device; and
   changing the display mode of the display apparatus to the final display mode using the received data.

14. The method as claimed in claim 13, further comprising, if the display apparatus is disconnected from the host device, updating information about the final display mode of the display apparatus.

* * * * *